(12) United States Patent
Shang et al.

(10) Patent No.: US 9,239,870 B1
(45) Date of Patent: Jan. 19, 2016

(54) MULTIPLE INSTANCE DATABASE AUTO-CONFIGURATION FOR HIGH AVAILABILITY

(71) Applicant: CA, Inc., Islandia, NY (US)

(72) Inventors: Guoxian Shang, Beijing (CN); Guodong Li, Beijing (CN); Haiyang Zhang, Beijing (CN)

(73) Assignee: CA, Inc., Islandia, NY (US)

( * ) Notice: Subject to any disclaimer, the term of this patent is extended or adjusted under 35 U.S.C. 154(b) by 289 days.

(21) Appl. No.: 13/890,033

(22) Filed: May 8, 2013

(51) Int. Cl.
*G06F 17/30* (2006.01)
*G06F 11/14* (2006.01)

(52) U.S. Cl.
CPC ...... *G06F 17/30581* (2013.01); *G06F 11/1469* (2013.01); *G06F 17/30575* (2013.01)

(58) Field of Classification Search
CPC ..................... G06F 17/30581; G06F 17/30575; G06F 11/1469
USPC ........................................................ 707/634
See application file for complete search history.

(56) References Cited

U.S. PATENT DOCUMENTS

| | | | |
|---|---|---|---|
| 5,745,669 A * | 4/1998 | Hugard et al. ..................... | 714/3 |
| 6,615,223 B1 * | 9/2003 | Shih et al. ..................... | 707/625 |
| 7,356,679 B1 * | 4/2008 | Le et al. ............................. | 713/1 |
| 7,639,669 B2 * | 12/2009 | Ejzak et al. .................... | 370/352 |
| 8,069,139 B2 * | 11/2011 | Garbow et al. ............... | 707/609 |
| 8,255,369 B2 * | 8/2012 | Luo et al. ...................... | 707/674 |

OTHER PUBLICATIONS

ORACLE, "Oracle Database Online Documentation 10g Release 2 (10.2) Listener Parameters", http://docs.oracle.com/cd/B19306_01/network.102/b14213/listener.htm as visited Jul. 23, 2015, May 1, 2012, 25 pages.
ORACLE, "Oracle Database Online Documentation, 10g Release 2 (10.2) Profile Parameters", http://docs.oracle.com/cd/B19306_01/network.102/b14213/sqlnet.htm as visited on Jul. 23, 2015, May 1, 2012, 51 pages.
ORACLE, "Oracle® Database Net Services Reference Guide 10g Release 1 Local Naming Parameters", http://docs.oracle.com/cd/B13789_01/network.101/b10776/tnsnames.htm as visited Jul. 23, 2015., May 1, 2012, 20 pages.

* cited by examiner

*Primary Examiner* — Debbie Le
(74) *Attorney, Agent, or Firm* — Gilliam IP PLLC

(57) ABSTRACT

A database is automatically configured for recovery. Operating system compatibility, system recovery compatibility, and database server compatibility is verified. If the system recovery configuration is not compatible, then the system recovery configuration is updated. If the database server configuration is not compatible, then the database server configuration is updated.

20 Claims, 3 Drawing Sheets

MULTIPLE INSTANCE DATABASE AUTO-CONFIGURATION FOR HIGH AVAILABILITY

BACKGROUND

Database recovery can include creating a copy of database data. Creating a copy of database data can require compatible computing device configurations between the backup database and the target database.

BRIEF SUMMARY

A system and method automatically configures a database for recovery. The method includes verifying operating system compatibility, database system compatibility, system recovery compatibility, and database server compatibility. If the system recovery configuration is not compatible, then the system recovery configuration is replicated. If the database server configuration is not compatible, then the database server configuration is replicated. Finally, the database data is replicated.

BRIEF DESCRIPTION OF THE DRAWINGS

Aspects of the present disclosure are illustrated by way of example and are not limited by the accompanying FIGS. with like references indicating like elements.

DETAILED DESCRIPTION

Database backup and recovery can include creating a copy (e.g., replication) of a database. Once a replica has been created, a database backup and recovery system can reconfigure the database system from using a database on a master server to using a backup database on a replica server. The database switch over can be manually initiated (e.g., switchover), or the database switch over can be automatically triggered if there is a failure of a database system (e.g., failover).

An advantage of one or methods discussed herein can include increased efficiency by avoiding the need to update the database server configuration on the replica server. Another advantage can include increased efficiency by avoiding the need to create or configure database instances on the replica server.

Figure 1:
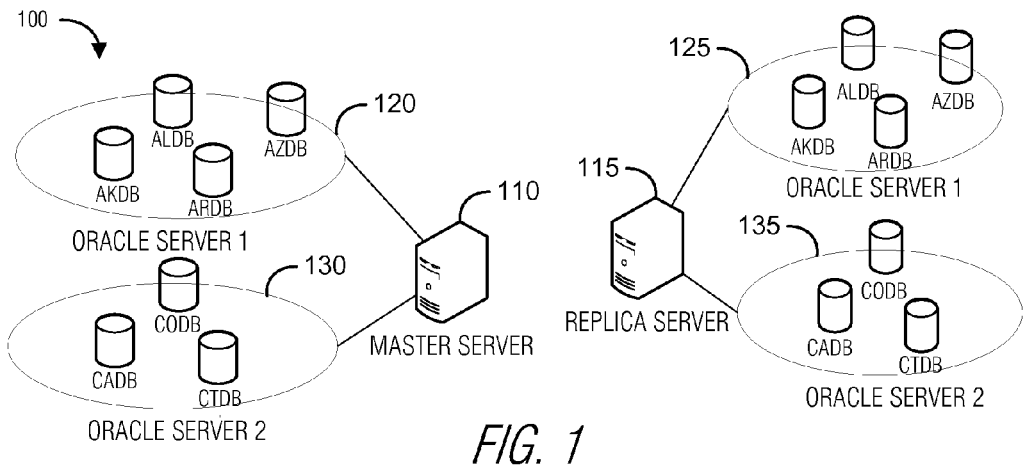
FIG. 1 illustrates a master/replica server configuration, including a master server and a replica server.

FIG. 1 illustrates a master/replica server configuration 100, according to an embodiment. The master/replica server configuration 100 can include a master server 110 and a replica server 115. The master server 110 can include a first master database server 120 (e.g., Oracle server), which can include four databases. The master server 110 can include a second master database server 130, which can include three databases. Following data replication, the replica server 115 can include a replicated copy of the databases on the master server 110. For example, the replica server 115 can include a first replicated database server 125, which can include the four databases replicated from the first master database server 120. The replica server 115 can include a second replicated database server 135, which can include the three databases replicated from the second master database server 130. Other numbers of servers can be used in the master/replica server configuration 100, and other numbers of databases can be used in each server.

Database data replication from a master server 110 to a replica server 115 can require several database replication configuration steps before database data is transferred from the master server 110 to the replica server 115. Database replication configuration steps can include verifying the compatibility of the database environment on the master server 110 and the replica server 115. Compatibility verification can include verifying operating system compatibility, database system compatibility, system recovery compatibility, and database server compatibility. Compatibility verification is described in FIG. 2 and accompanying text.

Figure 2:
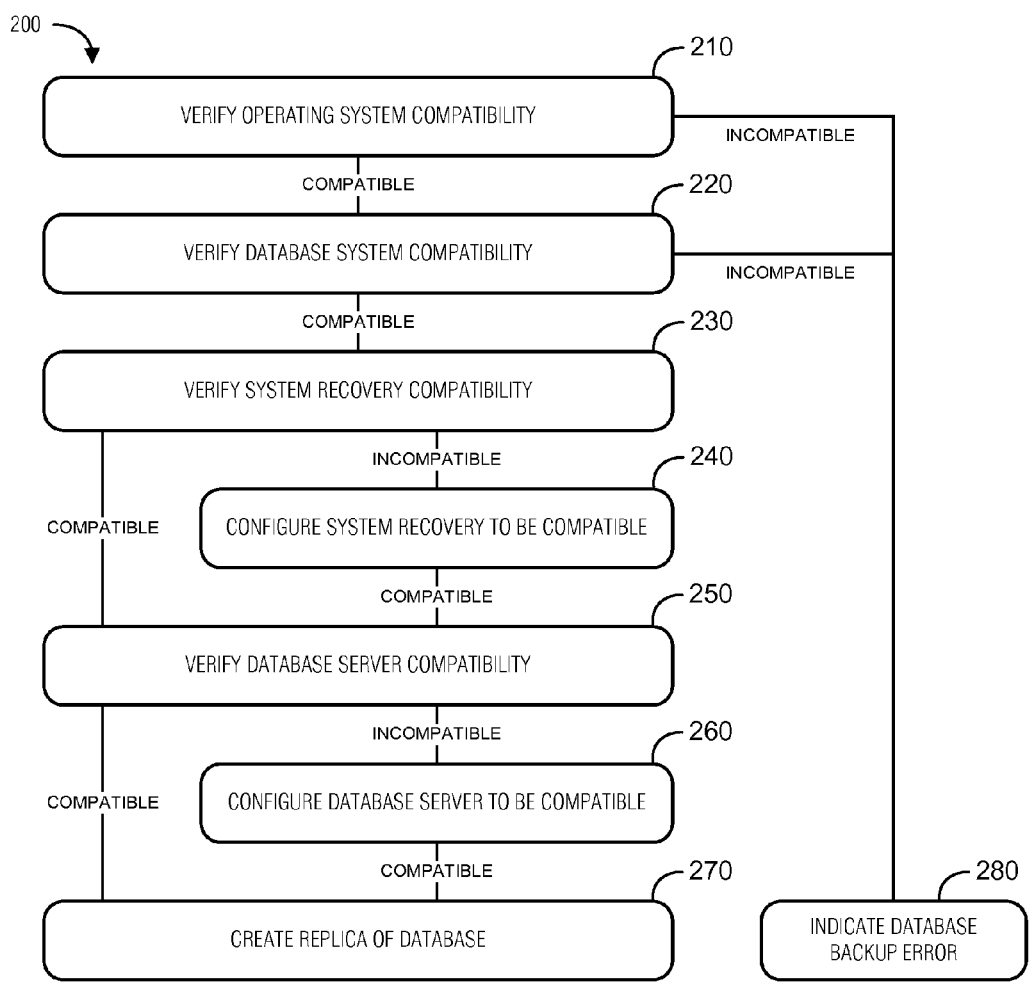
FIG. 2 illustrates updating registry entries related to a database instance.

FIG. 2 illustrates an example flowchart for implementing multiple instance database auto-configuration for high availability status, according to an example environment. Verifying operating system compatibility 210 can include verifying both master server 110 and replica server 115 are running a supported operating system (e.g., Windows Server) with the same configuration (e.g., same level of operating system service packs, same operating system hot fixes installed). If verification results indicate that the operating systems are incompatible, then the process cannot continue, and can notify a system administrator of a database backup error 280. Verifying database system compatibility 220 can include verifying a consistent database (e.g., Oracle) version is installed on both master server 110 and replica server 115 with the same configuration (e.g., same level of database service packs, same database hot fixes installed, same bit-mode). If verification results indicate that the database systems are incompatible, then the process cannot continue, and can notify a system administrator of a database backup error 280.

Verifying system recovery compatibility 230 can include verifying the master and replica switchover/failover software is compatible. If verification results indicate that the system recovery is incompatible or that the database servers are incompatible, then the process can configure the system recovery software 240. Verifying database server compatibility 250 can include verifying the master and replica databases are compatible. If verification results indicate that the databases are incompatible, then the process can configure database server and install empty databases 260.

If verification results indicate that both the system recovery is compatible and that the database servers are compatible, then the system can begin replicating the database 270 from the master server 110 to the replica server 115. After the configuration of the master database server and database replicas are stored 270, the system is prepared for a failover/switchover event.

Figure 3:
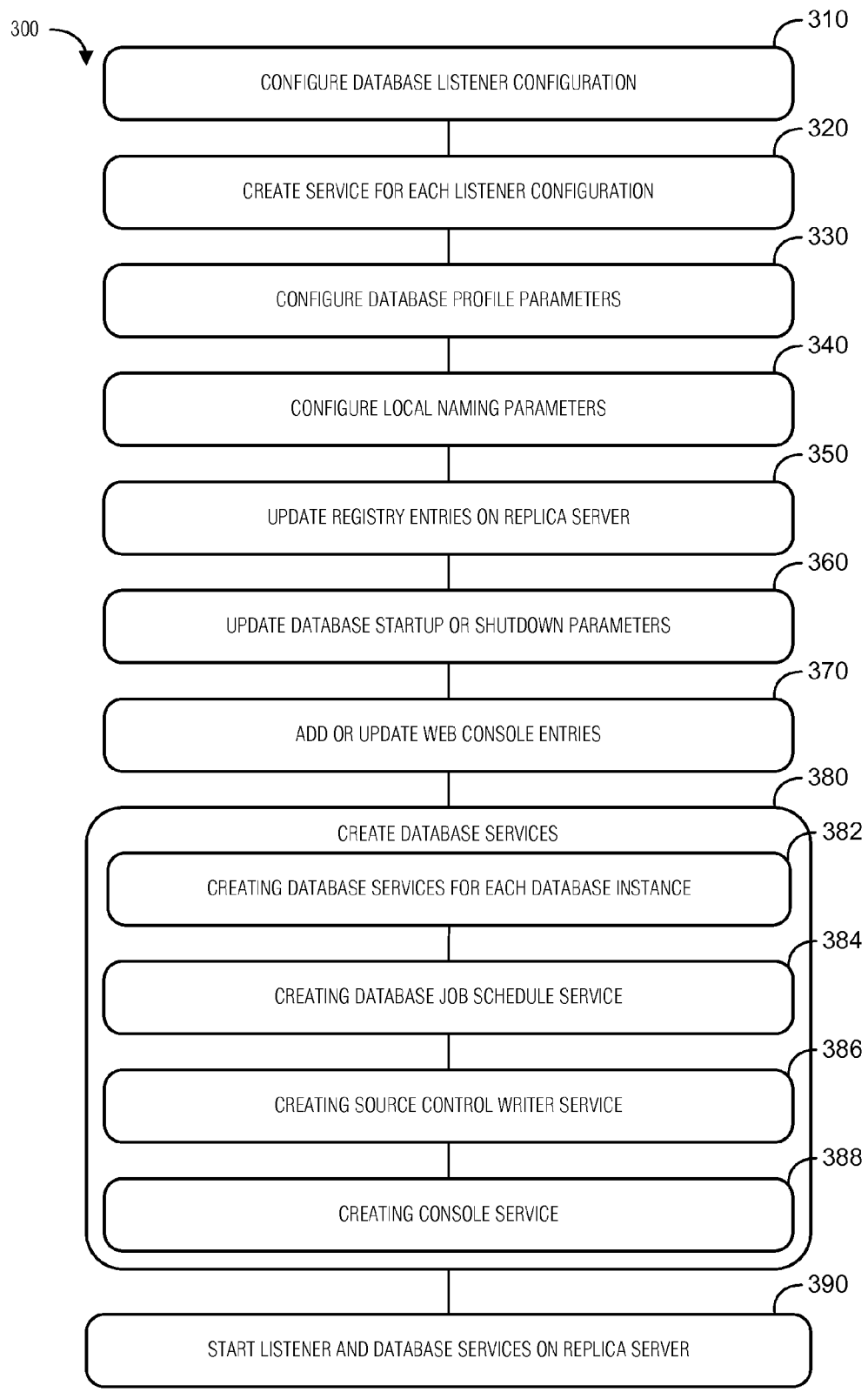
FIG. 3 illustrates an example flowchart for implementing multiple instance database auto-configuration for high availability status.

FIG. 3 illustrates an example flowchart for implementing replica database configuration for a failover/switchover event 300, according to an example environment. Replica database configuration can include configuring the database listener configuration 310 (e.g., internet protocol, internet address, static service registration, etc.). An operating system service can be created for each listener configuration 320 to allow the listener service to communicate with the replica database. The database profile parameters can be configured 330 on the replica server 115 to match the master server 110. The local naming parameters 340 can be configured on the replica server 115 to match the master server 110. The local naming parameters contain the service names mapped to connect descriptors for the local naming method, or net service names mapped to listener protocol addresses.

Replica database configuration can include updating registry entries 350 related to the database instance on the replica server 115. The database instance startup or shutdown parameters in each database server can be updated 360. The web console entries of the database instance can be added or updated with the hostname of the new database 370.

Replica database configuration can include creating database services 380 on the replica server 115 according the master server 110. Creating database services 380 can include creating database services for each database instance 382 on the replica server 115, where the replica service startup type can be configured to match the master server 110. Creating database services 380 can include creating a database job schedule service 384 for each database instance, where the replica service job schedules can be configured to match the master server 110. Creating database services 380 can include creating a source control writer service 386 for each database instance, where the source control writer service can be configured to match the master server 110. Creating database services 380 can include creating a console service for each database instance 388, where the console service can be configured to match the master server 110. Once creating database services 380 is complete, the listener services and the database services can be started 390 on the replica server 115 according to the master server 110.

Figure 4:
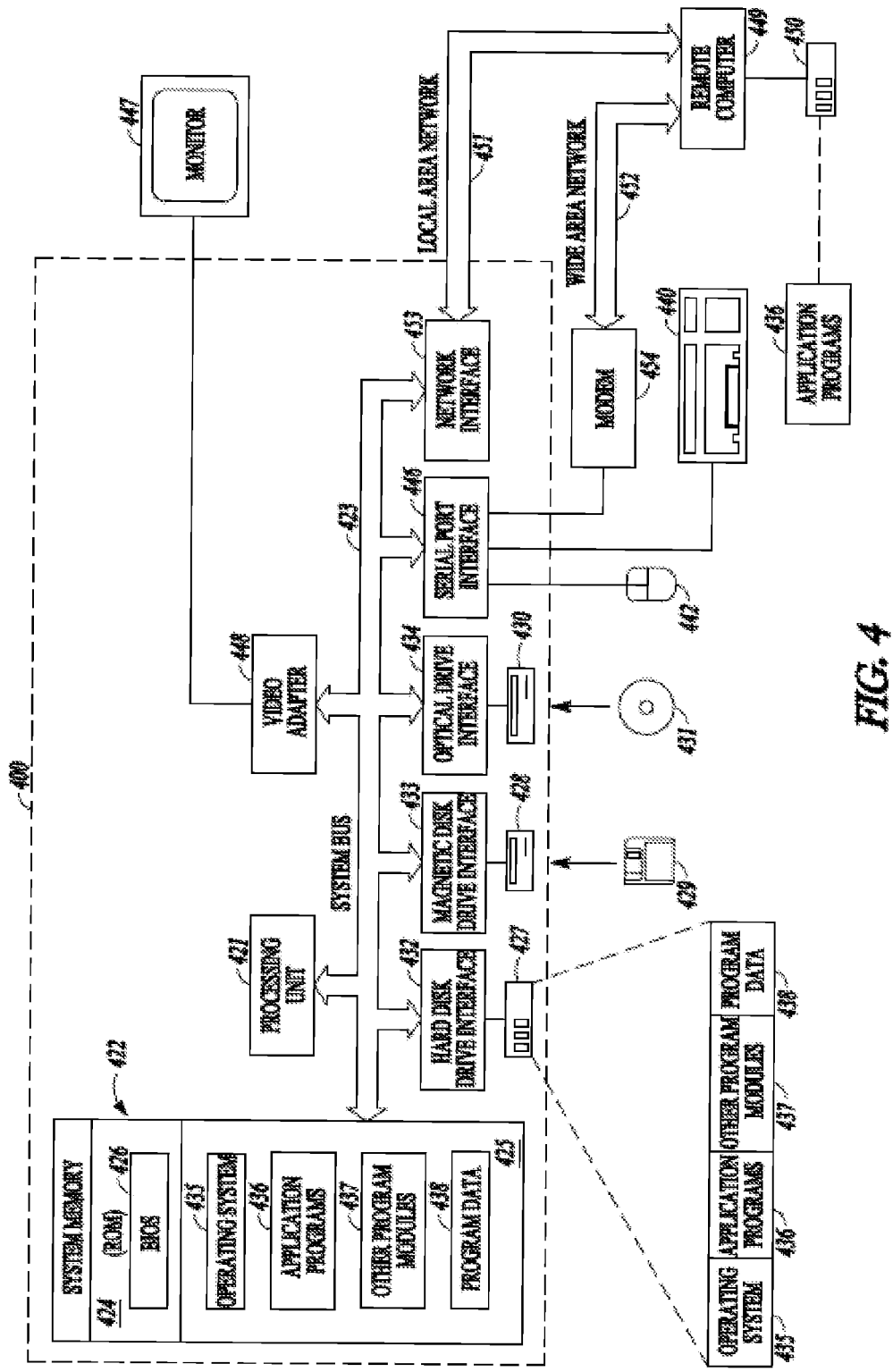
FIG. 4 illustrates an example of a computer system to implement techniques.

FIG. 4 shows a block diagram of an example of a computer system to implement various embodiments. In the embodiment shown in FIG. 4, a hardware and operating environment is provided that is applicable to any of the embodiments described. As shown in FIG. 4, the hardware and operating environment can include a general purpose computing device in the form of a computer 400 (e.g., a personal computer, workstation, or server), including one or more processing units 421, a system memory 422, or a system bus 423 that operatively couples various system components including the system memory 422 to the processing unit 421. There can be one or more one processing units 421, such that the processor of computer 400 comprises a single CPU, or a plurality of processing units, commonly referred to as a multiprocessor or parallel-processor environment. In one or more embodiments, computer 400 is a conventional computer, a distributed computer, or any other type of computer.

The system bus 423 can be any of several types of bus structures including a memory bus or memory controller, a peripheral bus, and a local bus using any of a variety of bus architectures. The system memory can also be referred to as simply the memory, and, in some embodiments, includes read-only memory (ROM) 424 and random-access memory (RAM) 425. A basic input/output system (BIOS) program 426, containing the basic routines that help to transfer information between elements within the computer 400, such as during start-up, can be stored in ROM 424. The computer 400 can further include a hard disk drive 427 for reading from and writing to a hard disk, not shown, a magnetic disk drive 428 for reading from or writing to a removable magnetic disk 429, and an optical disk drive 430 for reading from or writing to a removable optical disk 431 such as a CD ROM or other optical media.

The hard disk drive 427, magnetic disk drive 428, and optical disk drive 430 can couple with a hard disk drive interface 432, a magnetic disk drive interface 433, or an optical disk drive interface 434, respectively. The drives and their associated computer-readable media provide non-volatile storage of computer-readable instructions, data structures, program modules and other data for the computer 400. Any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the operating environment.

A plurality of program modules can be stored on the hard disk, magnetic disk 429, optical disk 431, ROM 424, or RAM 425, including an operating system 435, one or more application programs 436, other program modules 437, and program data 438. Programming for implementing one or more processes or method described herein can be resident on any one or number of these computer-readable media.

A user can enter commands and information into computer 400 through input devices such as a keyboard 440 and pointing device 442. Other input devices (not shown) can include a microphone, joystick, game pad, satellite dish, scanner, or the like. These other input devices are often connected to the processing unit 421 through a serial port interface 446 that is coupled to the system bus 423, but can be connected by other interfaces, such as a parallel port, game port, or a universal serial bus (USB). A monitor 447 or other type of display device can be connected to the system bus 423 via an interface, such as a video adapter 448. The monitor 447 can display a graphical user interface for the user. In addition to the monitor 447, computers typically include other peripheral output devices (not shown), such as speakers and printers.

The computer 400 can operate in a networked environment using logical connections to one or more remote computers or servers, such as remote computer 449. These logical connections through a communication device coupled to or a part of the computer 400; not limited to a particular type of communications device. The remote computer 449 can be another computer, a server, a router, a network PC, a client, a peer device or other common network node, and typically includes many or all of the elements described above relative to the computer 400. The logical connections depicted in FIG. 4 can include a local area network (LAN) 451 and/or a wide area network (WAN) 452. Such networking environments are commonplace in office networks, enterprise-wide computer networks, intranets and the internet, which are all types of networks.

When used in a LAN-networking environment, the computer 400 can be connected to the LAN 451 through a network interface or adapter 453, which is one type of communications device. In one or more embodiments, when used in a WAN-networking environment, the computer 400 can include a modem 454 (another type of communications device) or any other type of communications device (e.g., a wireless transceiver), for establishing communications over the wide-area network 452, such as the internet. The modem 454, which can be internal or external, is connected to the system bus 423 via the serial port interface 446. In a networked environment, program modules depicted relative to the computer 400 can be stored in the remote memory storage device 450 of remote computer 449. The network connections shown are examples of network connections and other means of, and communications devices for, establishing a communications link between the computers can be used including hybrid fiber-coax connections, T1-T3 lines, DSL's, OC-3 and/or OC-12, TCP/IP, microwave, wireless application protocol, and any other electronic media through any suitable switches, routers, outlets and power lines.

As will be appreciated by one skilled in the art, aspects of the present disclosure can be illustrated and described herein in any of a number of patentable classes or context including any new and useful process, machine, manufacture, or composition of matter, or any new and useful improvement thereof. Accordingly, aspects of the present disclosure can be implemented in entirely hardware, entirely software (including firmware, resident software, micro-code, etc.) or in a combination of software and hardware that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media can be utilized. The computer readable media can be a computer readable signal medium or a computer readable storage medium. A computer readable storage medium can be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable signal medium can be transmitted using any appropriate medium, including but not limited to wireless, wireline, optical fiber cable, RF, etc., or any suitable combination of the foregoing.

Computer program code for carrying out operations for aspects of the present disclosure can be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of techniques, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart(s) and block diagram(s) in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
    verifying that a first operating system configuration on a first computing device is compatible with a second operating system configuration on a second computing device;
    determining whether a first database listener configuration on the first computing device is compatible with a second database listener configuration on the second computing device, wherein the first database listener configuration identifies a plurality of listeners;
    updating, responsive to determining that the second database listener configuration is incompatible with the first database listener configuration, the second database listener configuration to be compatible with the first database listener configuration;
    determining whether a listener service corresponding to a listener of the plurality of listeners is configured on the second computing device;
    configuring, responsive to determining that the listener service corresponding to the listener of the plurality of listeners is not configured on the second computing device, the listener service on the second computing device;
    determining whether a first naming method configuration on the first computing device is compatible with a second naming method configuration on the second computing device, wherein a naming method is used for client name resolution lookups;
    updating, responsive to determining that the second naming method configuration on the second computing device is not compatible with the first naming method configuration on the first computing device, the second naming method configuration on the second computing device to be compatible with the first naming method configuration on the first computing device;
    determining whether a plurality of database services corresponding to a database instance are configured on the first computing device and are not configured on the second computing device;
    configuring, responsive to determining that the plurality of database services corresponding to the database instance are configured on the first computing device and are not configured on the second computing device, the plurality of database services on the second computing device; and
    starting the listener service and the plurality of database services on the second computing device.

2. The method of claim 1 further comprising replicating data associated with a first database from the first computing device to the second computing device.

3. The method of claim 1 further comprising:
    detecting, by a database manager, a database failure on the first computing device; and
    connecting, responsive to detecting the database failure, a database application on a third computing device to a database on the second computing device.

4. The method of claim 1, wherein the first operating system configuration comprises an operating system version, an operating system bit mode, a list of installed operating system service packs, and a list of installed operating system hotfixes.

5. The method of claim 1 further comprising verifying a database system configuration, wherein the database system configuration comprises a database system version, a database system bit mode, a list of installed database system service packs, and a list of installed database system hotfixes.

6. The method of claim 1 further comprising:
    configuring communication parameters; and
    configuring database startup and shutdown parameters.

7. The method of claim 1, wherein the plurality of database services comprises a database job scheduler, a database copy service, and a database console service.

8. A device comprising:
    a processor; and
    a computer readable storage medium comprising program code executable by the processor to cause the device to,
    confirm that a first operating system configuration on a first computing device is compatible with a second operating system configuration on a second computing device;
    determine whether a first database listener configuration on the first computing device is compatible with a second database listener configuration on the second computing device, wherein the first database listener configuration identifies a plurality of listeners;
    update, responsive to determining that the second database listener configuration is incompatible with the first database listener configuration, the second database listener configuration to be compatible with the first database listener configuration;
    determine whether a listener service corresponding to a listener of the plurality of listeners is configured on the second computing device;
    configure, responsive to determining that the listener service corresponding to the listener of the plurality of listeners is not configured on the second computing device, the listener service on the second computing device;
    determine whether a first naming method configuration on the first computing device is compatible with a second naming method configuration on the second computing device, wherein a naming method is used for client name resolution lookups;

update, responsive to determining that the second naming method configuration on the second computing device is not compatible with the first naming method configuration on the first computing device, the second naming method configuration on the second computing device to be compatible with the first naming method configuration on the first computing device;

determine whether a plurality of database services corresponding to a database instance are configured on the first computing device and are not configured on the second computing device;

configure, responsive to determining that the plurality of database services corresponding to the database instance are configured on the first computing device and are not configured on the second computing device, the plurality of database services on the second computing device; and start the listener service and the plurality of database services on the second computing device.

9. The device of claim 8, wherein the program code further comprises program code executable by the processor to cause the device to replicate data associated with a first database from the first computing device to the second computing device.

10. The device of claim 8, wherein the program code further comprises program code executable by the processor to cause the device to:
    detect a database failure on the first computing device; and
    connect, responsive to detecting the database failure, a database application on a third computing device to a database on the second computing device.

11. The device of claim 8, wherein the first operating system configuration comprises an operating system version, an operating system bit mode, a list of installed operating system service packs, and a list of installed operating system hotfixes.

12. The device of claim 8, wherein the program code further comprises program code executable by the processor to cause the device to verify a database system configuration, wherein the database system configuration comprises a database system version, a database system bit mode, a list of installed database system service packs, and a list of installed database system hotfixes.

13. The device of claim 8, wherein the program code further comprises program code executable by the processor to cause the device to:
    configure communication parameters; and
    configure database startup and shutdown parameters.

14. The device of claim 8, wherein the plurality of database services comprises a database job scheduler, a database copy service, and a database service.

15. A computer program product comprising a non-transitory computer readable storage medium having computer program instructions embodied therewith, the computer program instructions to:
    confirm that a first operating system configuration on a first computing device is compatible with a second operating system configuration on a second computing device;
    determine whether a first database listener configuration on the first computing device is compatible with a second database listener configuration on the second computing device, wherein the first database listener configuration identifies a plurality of listeners;
    update, responsive to determining that the second database listener configuration is incompatible with the first database listener configuration, the second database listener configuration to be compatible with the first database listener configuration;
    determine whether a listener service corresponding to a listener of the plurality of listeners is configured on the second computing device;
    configure, responsive to determining that the listener service corresponding to the listener of the plurality of listeners is not configured on the second computing device, the listener service on the second computing device;
    determine whether a first naming method configuration on the first computing device is compatible with a second naming method configuration on the second computing device, wherein a naming method is used for client name resolution lookups;
    update, responsive to determining that the second naming method configuration on the second computing device is not compatible with the first naming method configuration on the first computing device, the second naming method configuration on the second computing device to be compatible with the first naming method configuration on the first computing device;
    determine whether a plurality of database services corresponding to a database instance are configured on the first computing device and are not configured on the second computing device;
    configure, responsive to determining that the plurality of database services corresponding to the database instance are configured on the first computing device and are not configured on the second computing device, the plurality of database services on the second computing device; and
    start the listener service and the plurality of database services on the second computing device.

16. The computer program product of claim 15, wherein the computer program instructions further comprise computer program instructions to replicate data associated with a first database from the first computing device to the second computing device.

17. The computer program product of claim 15, wherein the computer program instructions further comprise computer program instructions to:
    detect a database failure on the first computing device; and
    connect, responsive to detecting the database failure, a database application on a third computing device to a database on the second computing device.

18. The computer program product of claim 15, wherein the first operating system configuration comprises an operating system version, an operating system bit mode, a list of installed operating system service packs, and a list of installed operating system hotfixes.

19. The computer program product of claim 15, wherein the computer program instructions further comprise computer program instructions to verify a database system configuration, wherein the database system configuration comprises a database system version, a database system bit mode, a list of installed database system service packs, and a list of installed database system hotfixes.

20. The computer program product of claim 15, wherein the computer program instructions further comprise computer program instructions to:
    configure communication parameters; and
    configure database startup and shutdown parameters.

* * * * *